United States Patent
Hwang

(10) Patent No.: US 12,361,913 B2
(45) Date of Patent: Jul. 15, 2025

(54) DISPLAY DEVICE AND POWER SHARING METHOD THEREOF

(71) Applicant: LG ELECTRONICS INC., Seoul (KR)

(72) Inventor: Kyungho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/423,198

(22) Filed: Jan. 25, 2024

(65) Prior Publication Data
US 2025/0131897 A1    Apr. 24, 2025

(30) Foreign Application Priority Data
Oct. 20, 2023    (KR) .................... 10-2023-0141577

(51) Int. Cl.
*G09G 5/10*    (2006.01)

(52) U.S. Cl.
CPC ......... *G09G 5/10* (2013.01); *G09G 2330/021* (2013.01); *G09G 2360/08* (2013.01)

(58) Field of Classification Search
CPC . G09G 5/10; G09G 2330/021; G09G 2360/08
See application file for complete search history.

(56) References Cited

U.S. PATENT DOCUMENTS

| 2020/0126476 | A1* | 4/2020 | Joo | G06F 3/1446 |
| 2021/0043149 | A1* | 2/2021 | Yoo | G09G 3/3291 |
| 2021/0295760 | A1* | 9/2021 | Lee | G09G 3/3426 |
| 2024/0212637 | A1* | 6/2024 | Kim | G09G 3/3426 |

FOREIGN PATENT DOCUMENTS

| KR | 10-2004-0102035 | 12/2004 |
| KR | 20140031713 | 3/2014 |
| KR | 1020190069214 | 6/2019 |
| KR | 102276575 | 7/2021 |
| KR | 102478672 | 12/2022 |
| KR | 10-2023-0059498 | 5/2023 |

OTHER PUBLICATIONS

European Patent Office Application Serial No. 24165461.5, Search Report dated Aug. 23, 2024, 12 pages.

* cited by examiner

*Primary Examiner* — Ryan A Lubit
(74) *Attorney, Agent, or Firm* — LEE, HONG, DEGERMAN, KANG & WAIMEY

(57) ABSTRACT

A display device comprises a first display, a first power supply unit (PSU) configured to supply power to the first display, a second display, a second PSU configured to supply power to the second display, and a processor configured to obtain a first average peak luminance (APL) of a first image to be displayed on the first display, obtain a second APL of a second image to be displayed on the second display and perform control to supply first reserve power of the first PSU or second reserve power of the second PSU to the first display or the second display based on a result of comparison between the first APL and the second APL.

15 Claims, 10 Drawing Sheets

DISPLAY DEVICE AND POWER SHARING METHOD THEREOF

CROSS-REFERENCE TO RELATED APPLICATION

Pursuant to 35 U.S.C. § 119, this application claims the benefit of earlier filing date and right of priority to Korean Application No(s). 10-2023-0141577, filed on Oct. 20, 2023, the contents of which are all incorporated by reference herein in its entirety.

FIELD

The present disclosure relates to a display device and, more particularly, to a display device for sharing power of digital signage.

BACKGROUND

Digital signage is a form of media that uses digital signals and technology to convey information or display advertisements.

Digital signage is used in a variety of locations using displays, screens, or projectors. Digital signage is especially popular in commercial environments, and is used in stores, banks, transportation terminals, hotels, restaurants and other locations to provide information or display advertisements to customers.

LED signboard products, which are mainly used as digital signage, consist of displays in the form of N×N.

Each display receives AC power, converts AC power into DC power, and independently performs power operation using the converted DC power.

However, there is a problem that when the power of each display is available but cannot be used depending on the screen image, the power of the display is being used inefficiently for the entire image.

SUMMARY

An object of the present disclosure is to identify the reserve power of a power supply circuit corresponding to each display in digital signage and to use the identified reserve power efficiently.

An object of the present disclosure is to improve image expressiveness by efficiently using the reserve power of the power supply circuit corresponding to each display in digital signage.

A display device according to an embodiment of the present disclosure comprises a first display, a first power supply unit (PSU) configured to supply power to the first display, a second display, a second PSU configured to supply power to the second display, and a processor configured to obtain a first average peak luminance (APL) of a first image to be displayed on the first display, obtain a second APL of a second image to be displayed on the second display and perform control to supply first reserve power of the first PSU or second reserve power of the second PSU to the first display or the second display based on a result of comparison between the first APL and the second APL.

The processor may perform control to supply the first reserve power of the first PSU to the second display, when the first APL is greater than the second APL.

The processor may perform control to supply the first reserve power of the first PSU to the second display, when the first APL is peak luminance and the second APL is maximum luminance.

The processor may obtain the first reserve power of the first PSU based on a first white rate of the first image and obtain the second reserve power of the second PSU based on a second white rate of the second image.

The display device may further comprise a memory configured to store a matching table including a plurality of white rates and a plurality of reserve powers respectively matching the plurality of white rates, and the processor may obtain the first reserve power and the second reserve power through the matching table.

The display device may further comprise a switch circuit configured to connect or disconnect the first PSU and the second display, and the processor may control the switch circuit to supply the first reserve power of the first PSU to the second display.

The processor may perform control to supply the second reserve power of the second PSU to the first display, when the first APL is less than the second APL.

The first PSU and the second PSU may be connected to each other through a power cable.

A method of sharing power of a display device comprising a first display, a first power supply unit (PSU) configured to supply power to the first display, a second display and a second PSU configured to supply power to the second display according to an embodiment of the present disclosure may comprise obtaining a first average peak luminance (APL) of a first image to be displayed on the first display, obtaining a second APL of a second image to be displayed on the second display and performing control to supply first reserve power of the first PSU or second reserve power of the second PSU to the first display or the second display based on a result of comparison between the first APL and the second APL.

The performing control may comprise performing control to supply the first reserve power of the first PSU to the second display, when the first APL is greater than the second APL.

The performing control may comprise performing control to supply the first reserve power of the first PSU to the second display, when the first APL is peak luminance and the second APL is maximum luminance.

The method may further comprise obtaining the first reserve power of the first PSU based on a first white rate of the first image and obtaining the second reserve power of the second PSU based on a second white rate of the second image.

The method may further comprise storing a matching table including a plurality of white rates and a plurality of reserve powers respectively matching the plurality of white rates, and the obtaining the first reserve power and the second power comprises obtaining the first reserve power and the second reserve power through the matching table.

The display device may further comprise a switch circuit configured to connect or disconnect the first PSU and the second display, and the performing control may comprise controlling the switch circuit to supply the first reserve power of the first PSU to the second display.

The performing control may comprise performing control to supply the second reserve power of the second PSU to the first display, when the first APL is less than the second APL.

According to an embodiment of the present disclosure, it is possible to express up to luminance higher than total luminance of an LED signboard.

In addition, according to an embodiment of the present disclosure, contrast between bright and dark parts can be clearly expressed, thereby realizing higher image quality.

In addition, according to an embodiment of the present disclosure, efficient operation is possible in terms of power consumption, thereby reducing costs. Accordingly, it can be used as a solution for international energy standards.

DETAILED DESCRIPTION OF THE PREFERRED EMBODIMENTS

Hereinafter, embodiments related to the present invention will be described in more detail with reference to the drawings. A suffix "module" or "part" for each component used in the following description are given or used interchangeably only for the ease of preparing the specification, and the suffix itself is not intended to have any special meaning or function.

The display device according to an embodiment of the present invention is, for example, an intelligent display device that adds a computer support function to a broadcast reception function, and may have a more convenient interface than a handwriting input device, a touchscreen or a pointing device, by adding an Internet function while being faithful to the broadcast reception function. In addition, by supporting wired or wireless Internet functions, it can be connected to the Internet and computers to perform functions such as email, web browsing, banking, or gaming. A standardized general-purpose OS may be used for these various functions.

Accordingly, in the display device described in the present invention, for example, various applications can be freely added or deleted on a general-purpose OS kernel, and thus various user-friendly functions can be performed.

More specifically, the display device may be, for example, a network TV, HBBTV, smart TV, LED TV, OLED TV, etc.

Figure 1:
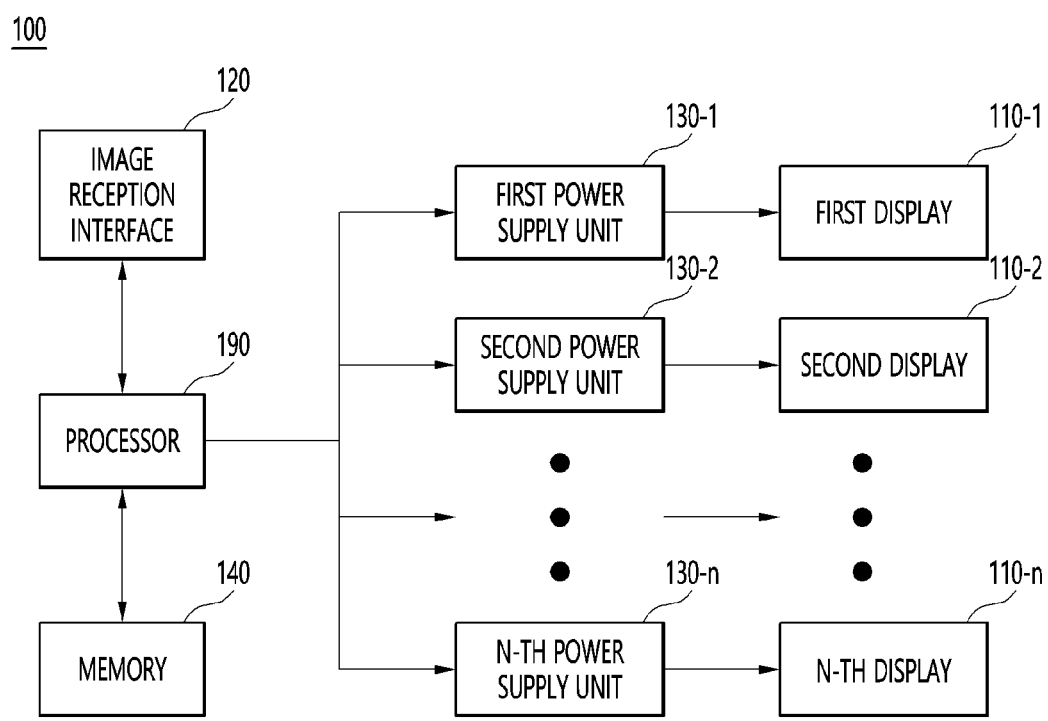
FIG. 1 is a block diagram of the configuration of a display device according to an embodiment of the present invention.

FIG. 1 is a block diagram of the configuration of a display device according to an embodiment of the present invention.

The display device 100 may include a plurality of displays 110-1 to 110-n, a plurality of power supply units 130-1 to 130-n, an image reception interface 120, a memory 140, and a processor 190.

The plurality of displays 110-1 to 110-n may be arranged in an N×N shape and may form LED signage.

Each of the plurality of displays 110-1 to 110-n may be an LED (Light Emitting Diode) display.

Each of the plurality of displays 110-1 to 110-n may include a display panel, a backlight unit including a plurality of LEDs, and an LED driving circuit.

The backlight unit may include a plurality of LEDs and may supply light to the display panel.

The LED driving circuit may include a timing controller, a gate driver for applying a gate signal to the display panel, and a data driver for applying a data signal to the display panel.

The timing controller may receive a control signal, R/G/B data signal, and vertical synchronization signal Vsync of the processor 190.

The timing controller may control the gate driver and data driver in response to the control signal, rearrange the R/G/B data signal, and provide it to the data driver.

Each of the plurality of power supply units 130-1 to 130-n may supply power to each of the plurality of displays 110-1 to 110-n.

Each power supply unit may be provided with a power supply circuit that supplies direct current power.

Each power supply unit may be connected to adjacent power supply units via a power cable.

Any one power supply unit may be connected to one or two other power supply units adjacent in a horizontal direction.

Any one power supply unit may be connected to one or two other power supply units adjacent in a vertical direction.

The image reception interface 120 may receive an image from an external device or a content provision server.

The image reception interface 120 may include a tuner that selects a specific broadcast channel according to a channel selection command.

The image reception interface 120 may receive a content video signal from a content provision server.

The memory 140 may store programs for processing and controlling each signal in the processor 190, and store signal-processed video, voice, or data signals.

The processor 190 may control the overall operation of the display device 100.

The processor 190 may be provided on one of the plurality of displays 110-1 to 110-n, or may be provided separately from the plurality of displays 110-1 to 110-n.

A plurality of processors 190 may be configured. The processor 190 may be configured in the form of a chip.

Figure 2A:
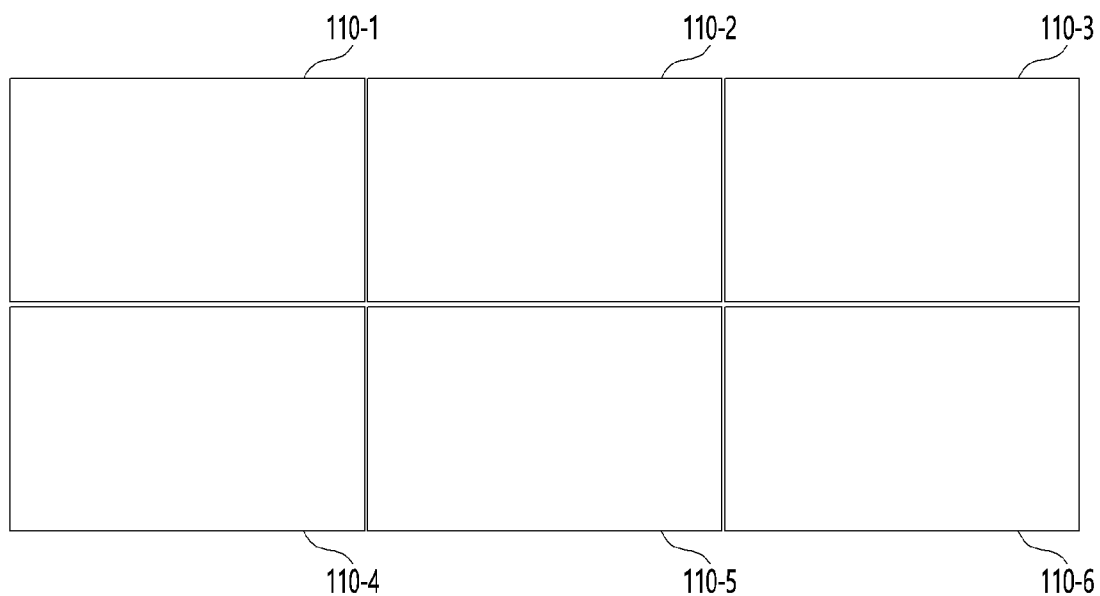
FIG. 2A is a diagram illustrating a front surface of a 3×2 display device according to an embodiment of the present disclosure.
Figure 2B:
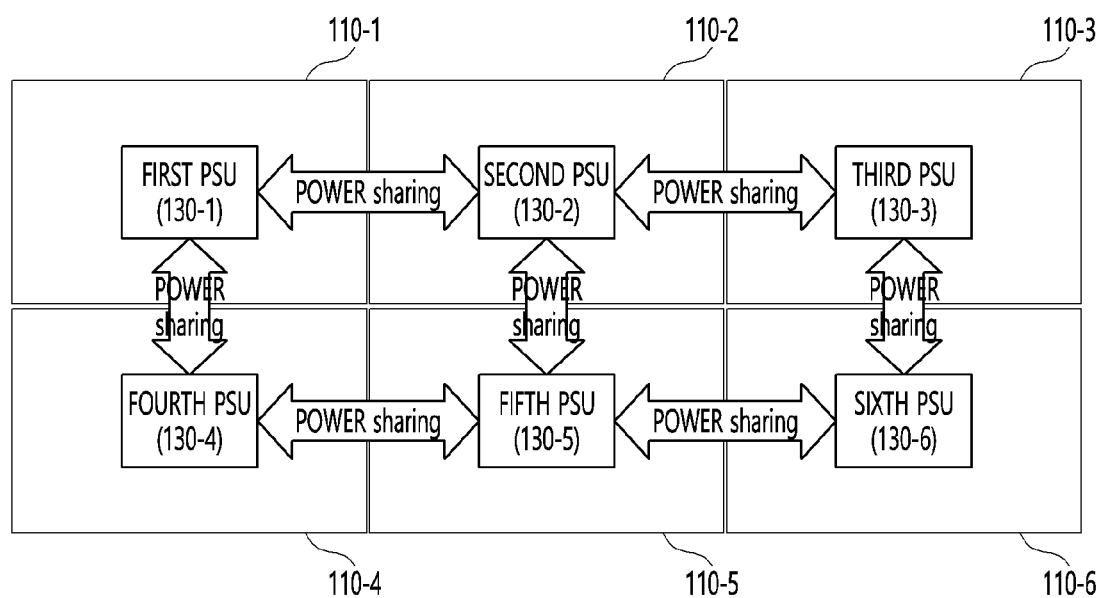
FIG. 2B is a diagram illustrating a rear surface of a 3×2 display device according to an embodiment of the present disclosure.

FIG. 2A is a diagram illustrating a front surface of a 3×2 display device according to an embodiment of the present disclosure, and FIG. 2B is a diagram illustrating a rear surface of a 3×2 display device according to an embodiment of the present disclosure.

Referring to FIG. 2A, the front surface of the 3×2 display device 100 is shown.

The 3×2 display device 100 may include six displays 110-1 to 110-6. Each of the six displays 110-1 to 110-6 may display partial images.

Accordingly, the entire image may be displayed through six displays 110-1 to 110-6. Referring to FIG. 2B, the rear surface of the 3×2 display device 100 is shown.

A power supply unit (PSU) may be provided on the rear surface of each of the six displays 110-1 to 110-6.

That is, the first PSU 130-1 that supplies power to the first display 110-1 may be provided on the rear surface of the first display 110-1, the second PSU 130-2 that supplies power to the second display 110-2 may be provided on the rear surface of the second display 110-2, the third PSU 130-3 that supplies power to the third display 110-3 may be provided on the rear surface of the third display 110-3, the fourth PSU 130-4 that supplies power to the fourth display 110-4 may be provided on the rear surface of the fourth display 110-4, the fifth PSU 130-5 that supplies power to the fifth display 110-5 may be provided on the rear surface of the fifth display 110-5, and the sixth PSU 130-6 that supplies power to the sixth display 110-6 may be provided on the rear surface of the sixth display 110-6.

Each PSU may be connected via a cable to share power with PSUs adjacent either in a horizontal or vertical direction.

For example, the second PSU 130-2 may share power with the first PSU 130-1 adjacent in the left horizontal direction, the third PSU 130-3 adjacent in the right horizontal direction, or the fifth PSU adjacent in the lower vertical direction 130-5.

Each PSU may be connected via a cable to share power with PSUs adjacent in a diagonal direction.

Figures 3, 4:
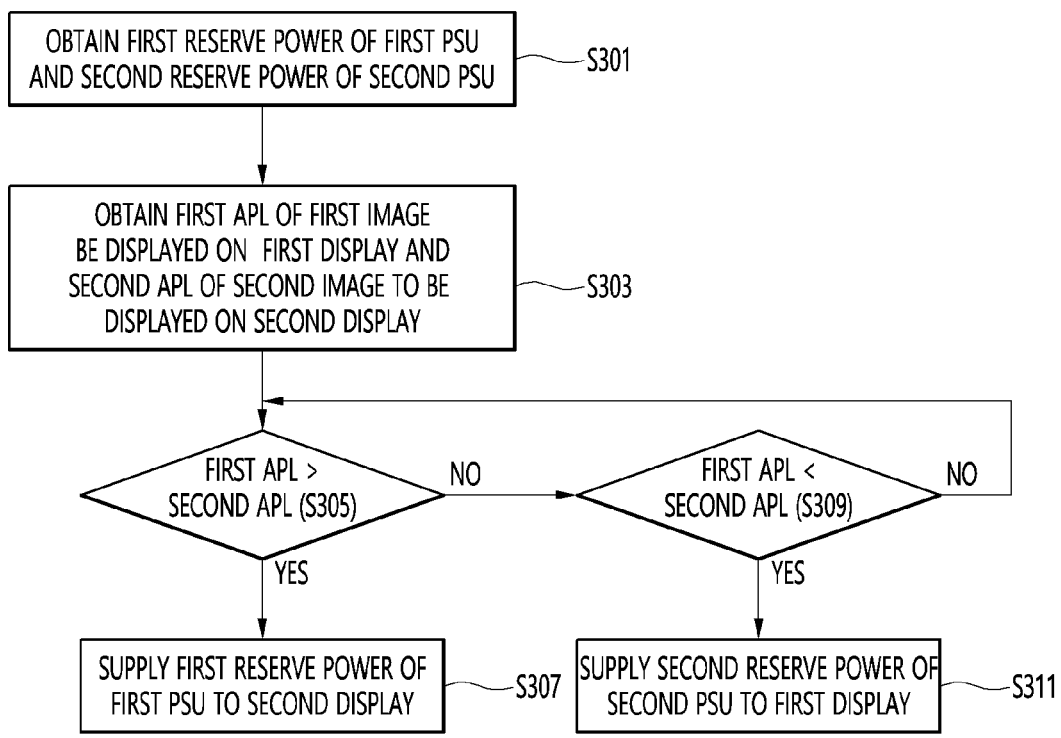
FIG. 3 is a flowchart illustrating a method of sharing power of a display device according to an embodiment of the present disclosure.
FIG. 4 is a diagram illustrating a matching table according to an embodiment of the present disclosure.

FIG. 3 is a flowchart illustrating a method of sharing power of a display device according to an embodiment of the present disclosure.

Hereinafter, the method of sharing power of the display device 100 will be described with reference to FIGS. 1 to 2B.

Referring to FIG. 3, the processor 190 of the display device 100 may obtain first reserve power of the first PSU 130-1 and reserve power of the second PSU 130-2 (S301).

The processor 190 may obtain reserve power of the first PSU 130-1 based on a first white rate of a first image to be displayed on the first display 110-1, and obtain reserve power of the second PSU 130-2 based on a second white rate of a second image to be displayed in the second display 110-2.

The processor 190 may obtain the white rate of the image by calculating the number of pixels outputting white color among all pixels.

In other words, the white rate of the image may be calculated as (number of white pixels/total number of pixels) *100%.

The processor 190 may calculate the white rate of the image based on the RGB data of the image frame.

The processor 190 may obtain the reserve power of each PSU using a matching table representing the correspondence between the white rate and the reserve power of the PSU.

The memory 140 may store a matching table in which a plurality of white rates respectively correspond to a plurality of reserve powers.

FIG. 4 is a diagram illustrating a matching table according to an embodiment of the present disclosure.

Referring to FIG. 4, the matching table 400 showing the reserve power according to the white rate is shown.

The reserve power of the PSU according to the white rate may be measured in advance by an administrator and stored in the memory 140 in the form of a table.

The processor 190 may measure the white rate of the image frame displayed on each display and extract the reserve power of the PSU that matches the measured white rate through the matching table 400.

FIG. 3 will be described again.

The processor 190 may obtain a first APL of the first image to be displayed on the first display 110-1 and a second APL of the second image to be displayed on the second display 100-2 (S303).

The processor 190 may measure the first APL of the first image to be input to the first display 110-1 and the second APL of the second image to be input to the second display 110-2 through the Vx1 interface standard.

The processor 190 may calculate the APL of each image. The APL may be calculated using the following [Equation 1].

$$APL(\%) = \frac{\text{SUM}\{\text{Max.}(R, G, B)255\}}{\text{Total number of pixels}} \times 100 \quad \text{[Equation 1]}$$

Here, R means red data, G means green data, and B means blue data. Max (R, G, B) is the maximum value among R, G, and B, and SUM {Max (R, G, B)} is a sum of the maximum values among R, G, and B. An image with a large number of bright pixel data have high average peak luminance (APL). On the other hand, an image with a small number of bright pixel data has low average peak luminance (APL).

The processor 190 may determine whether the first APL is greater than the second APL (S305), and control the first PSU 130-1 to supply first reserve power of the first PSU 130-1 to the second display 110-2 when the first APL is greater than the second APL (S307).

The processor 190 may compare the APLs of images to be respectively displayed on the displays and control the reserve power of the PSU based on the comparison result.

The APL function is applied to the display device 100. The APL function may be a previously commercialized function that analyzes an image signal, determines the white rate of the image, and controls luminance based on the white rate.

The APL function will be described later.

Figure 5A:
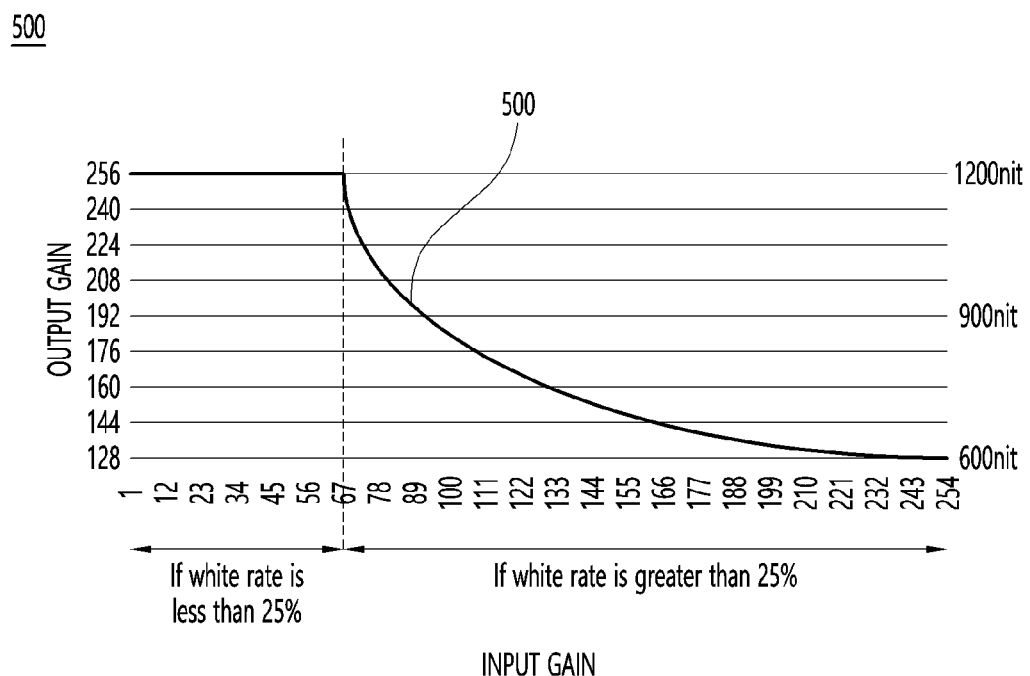
FIG. 5A is a diagram illustrating an APL gain curve illustrating an APL function applied to a display device according to an embodiment of the present disclosure.
Figure 5B:
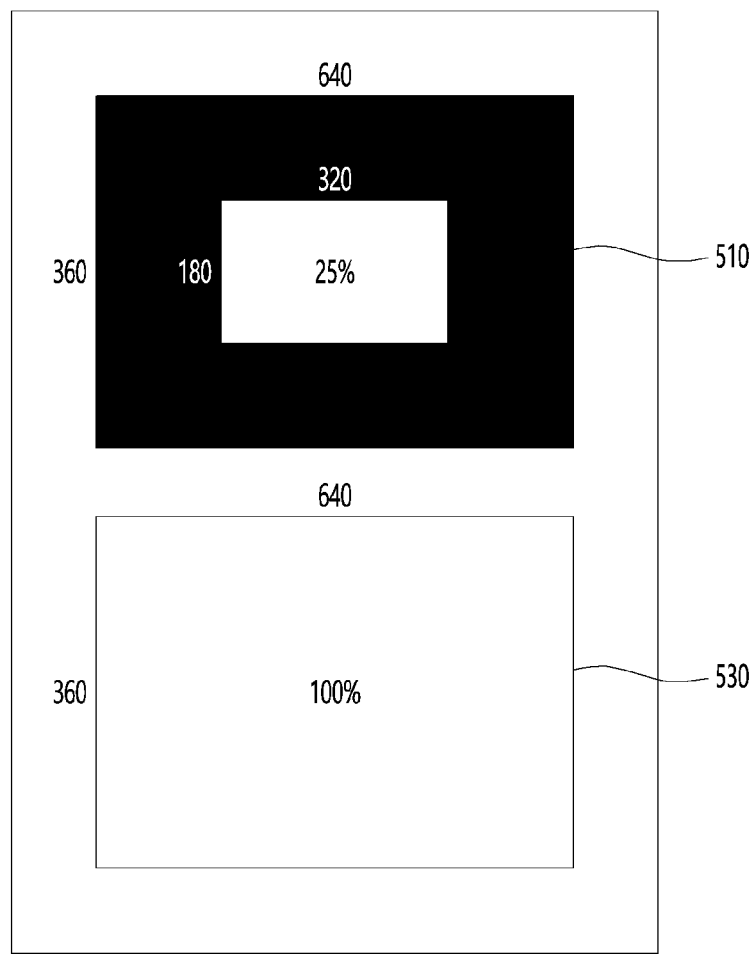
FIG. 5B is a diagram illustrating a white rate over the entire area.

FIG. 5A is a diagram illustrating an APL gain curve illustrating an APL function applied to a display device according to an embodiment of the present disclosure, and FIG. 5B is a diagram illustrating a white rate over the entire area.

Referring to FIG. 5A, an APL gain curve 500 showing the progress of output gain compared to input gain is shown.

The input gain may represent a gray scale level ranging from 0 to 255, and the output gain may also represent a gray scale level from 0 to 255.

The APL function may be a function for expressing the luminance from the specification luminance (600 nits) to the peak luminance (1200 nits) if the white rate is less than 25%, lowering the luminance if the white rate is greater than 25%, and adjusting the luminance to 600 nits which is the specification luminance when the white rate reaches 100%.

FIG. 5B shows an image 510 with an aspect ratio of 640×360 and a white rate of 25%, and an image 530 with an aspect ratio of 640×360 and a white rate of 100%.

The processor 190 may control the display to output the peak luminance (1200 nits) when the white rate of the image is less than 25%. When the white rate is equal to or greater than 25%, the processor 190 may control the display to output luminance less than the peak luminance. The processor 190 may control the display to output specification luminance (600 nits) when the white rate is 100%.

FIG. 3 will be described again.

When the first APL is the peak luminance and the second APL is less than the peak luminance, the processor 190 may control the first PSU 130-1 to supply the reserve power of the first PSU 130-1 to the second display 110-2.

To this end, the processor 190 may transmit a power sharing signal to the first PSU 130-1 to supply the reserve power of the first PSU 130-1 to the second PSU 130-2.

In one embodiment, the first PSU 130-1 may send its reserve power to the second PSU 130-2 through a cable according to the power sharing signal. A switch circuit (not shown) may be provided between the first PSU 130-1 and the second PSU 130-2. The processor 190 may control the switch circuit so that the reserve power of the first PSU 130-1 is supplied to the second PSU 130-2.

In another embodiment, the first PSU 130-1 may directly send its power to the second display 110-2 through a cable according to the power sharing signal. To this end, the first PSU 130-1 and the second display 110-2 may be connected to each other through a cable.

A switch circuit (not shown) may be provided between the first PSU 130-1 and the second display 110-2. The processor 190 may control the switch circuit so that the reserve power of the first PSU 130-1 is supplied to the second display 110-2.

As a result, the second display 110-2 may receive power from the first PSU 130-1 and the second PSU 130-2.

Meanwhile, the processor 190 may determine whether the first APL is less than the second APL (S309), and control the second PSU 130-2 to supply the second reserve power of the second PSU 130-2 to the first display 110-1 when the first APL is less than the second APL (S311).

In one embodiment, when the second APL is the peak luminance and the first APL is less than the peak luminance, the processor 190 may control the second PSU 130-2 to supply the reserve power of the second PSU 130-2 to the first display 110-1.

To this end, the processor 190 may transmit the power sharing signal to the second PSU 130-2 to supply the reserve power of the second PSU 130-2 to the first PSU 130-1.

In one embodiment, the second PSU 130-2 may send its reserve power to the first PSU 130-1 through a cable according to the power sharing signal. The processor 190 may control the switch circuit so that the reserve power of the second PSU 130-2 is supplied to the first PSU 130-1.

In another embodiment, the second PSU 130-2 may directly send its power to the first display 110-1 through a cable according to the power sharing signal. To this end, the second PSU 130-2 and the first display 110-1 may be connected to each other through a cable.

A switch circuit (not shown) may be provided between the second PSU 130-2 and the first display 110-1. The processor 190 may control the switch circuit so that the reserve power of the second PSU 130-2 is supplied to the first display 110-1.

As a result, the first display 110-1 may receive power from the first PSU 130-1 and the second PSU 130-2.

In this way, the display device 100 according to the embodiment of the present disclosure can efficiently use the reserve power of the PSU in LED signage, thereby improving the expressiveness of the image.

In addition, contrast between bright and dark parts can be clearly expressed, enabling higher image quality to be realized.

Figure 6A:
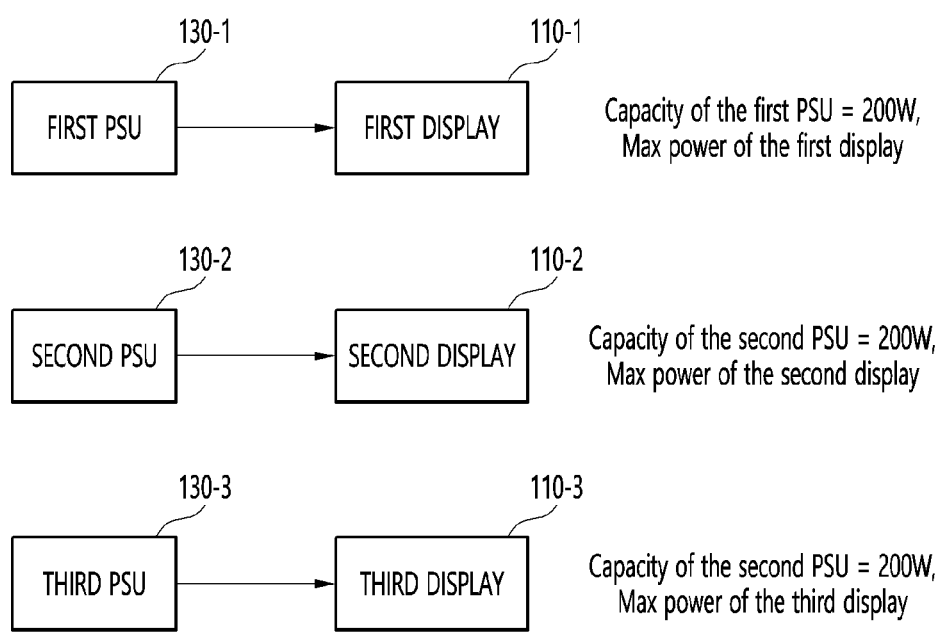
FIG. 6A is a diagram explaining a process in which a PSU supplies power to a display corresponding thereto.
Figure 6B:
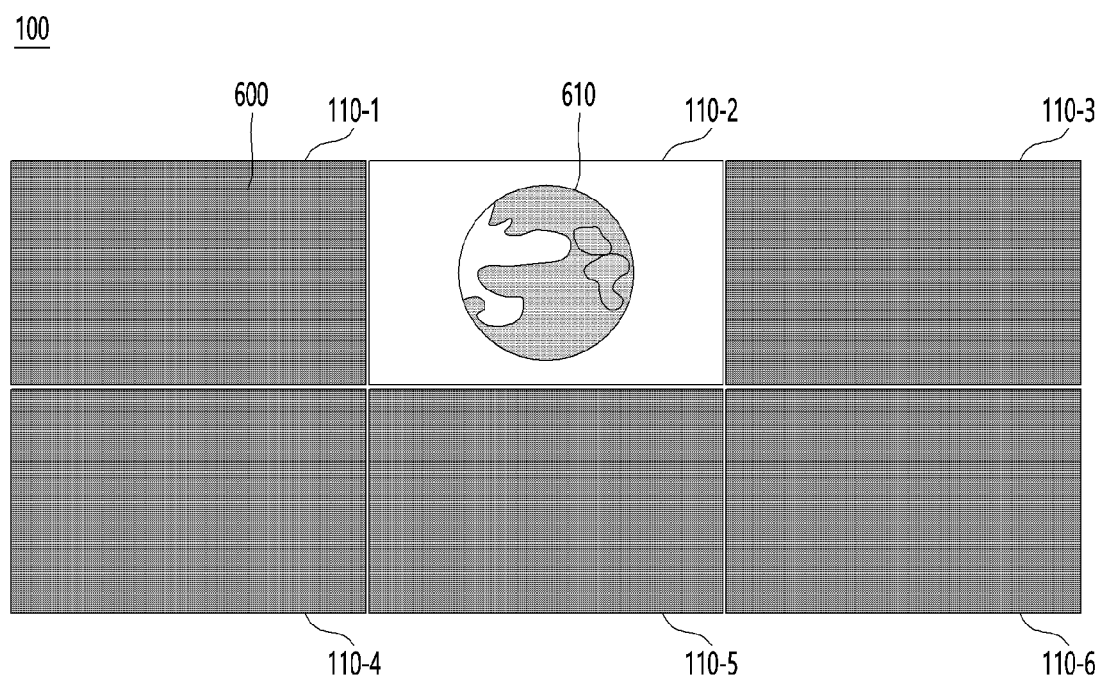
FIGS. 6B and 6C are diagrams explaining a process in which a plurality of PSUs share power with one display.
Figure 6C:
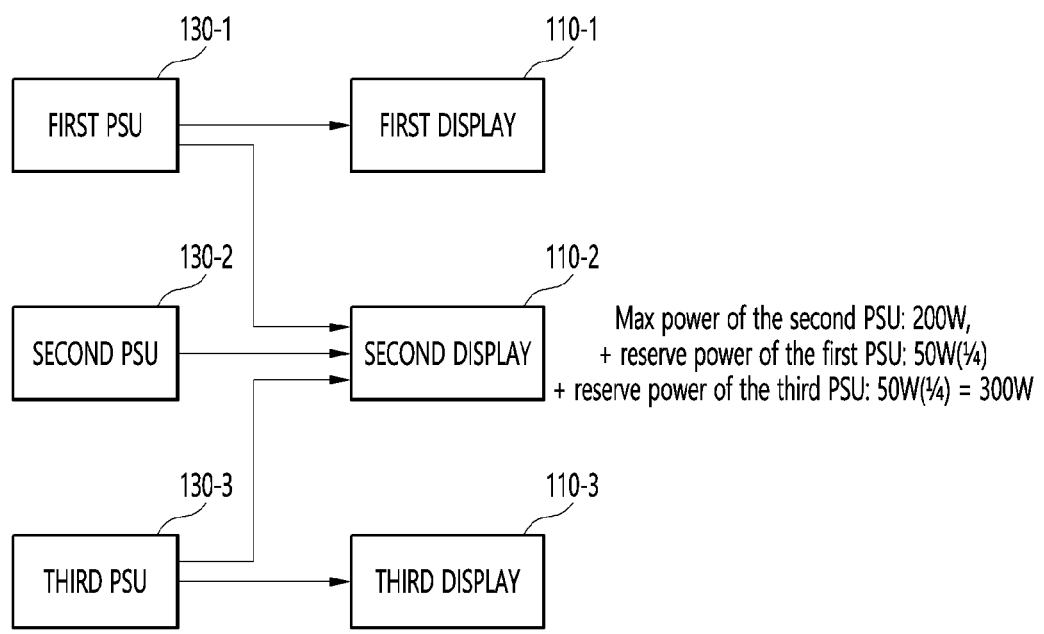

FIG. 6A is a diagram explaining a process in which a PSU supplies power to a display corresponding thereto, and FIGS. 6B and 6C are diagrams explaining a process in which a plurality of PSUs share power with one display.

FIG. 6A is a diagram illustrating an example in which each PSU supplies power to the display corresponding thereto, rather than a power sharing situation.

The first PSU 130-1 may supply power to the first display 110-1. The capacity of the first PSU 130-1 is 200 W, and 200 W is the maximum power consumption supplied from the first PSU 130-1 to the first display 110-1.

The second PSU 130-2 may supply power to the second display 110-2. The capacity of the second PSU 130-2 is 200 W, and 200 W is the maximum power consumption supplied from the second PSU 130-2 to the second display 110-2.

The third PSU 130-3 may supply power to the third display 110-3. The capacity of the third PSU 130-3 is 200 W, and 200 W is the maximum power consumption supplied from the third PSU 130-3 to the third display 110-3.

Referring to FIG. 6B, the display device 100 may display a night sky image 600 including a moon image 610 on the plurality of displays 110-1 to 110-6.

The moon image 610 may be displayed on the second display 110-2, and a black image may be displayed on the remaining displays.

That is, in the night sky image 600, the moon image 610 is displayed only on the second display 110-2 among the six displays 110-1 to 110-6. Therefore, only the second display 110-2 requires a bright image.

The display device 100 may obtain reserve power for each PSU based on the white rate of the image to be displayed on each of the plurality of displays 110-1 to 110-6.

For example, the display device 100 may calculate a first white rate of the black image to be displayed on the first display 110-1, a second white rate of the moon image 610 to be displayed on the second display 110-2 and a third white rate of the black image to be displayed on the third display 110-3.

The display device 100 may obtain the reserve power of the PSU corresponding to each of the first, second, and third white rates using the matching table stored in the memory 140.

The matching table utilizes the embodiment of FIG. 4.

For example, when the first white rate is 0%, the processor 190 may extract that the reserve power of the first PSU 110-1 is 50 W (¼ of the maximum capacity) through the matching table 400.

When the second white rate is 100%, the processor 190 may extract that the reserve power of the second PSU 110-2 is 0W through the matching table 400.

When the third white rate is 0%, the processor 190 may extract that the reserve power of the third PSU 110-3 is 50 W (¼ of the maximum capacity) through the matching table 400.

When the APL of the moon image 610 to be displayed on the second display 110-2 is less than the peak luminance, the processor 190 may control the first PSU 130-1 and the third PSU 130-3 so that the reserve power (50 W) of the first PSU 130-1 and the reserve power (50 W) of the third PSU 130-3 are supplied to the second display 110-2.

That is, as shown in FIG. 6C, the second display 110-2 may receive power of 30 W which is a sum of 200 W supplied from the second PSU 130-2, 50 W supplied from the first PSU 130-1, and 50 W supplied from the third PSU 130.

If the second display 110-2 does not share power, it is assumed that the maximum luminance which may be output by the second display 110-2 is 600 nits.

However, as in the embodiment of the present disclosure, when the second display 110-2 receives a total of 300 W of power through power sharing, luminance higher than the maximum luminance which may be output by the second display 110-2 may be output.

Accordingly, the expressiveness of the screen can be further improved.

Figure 7:
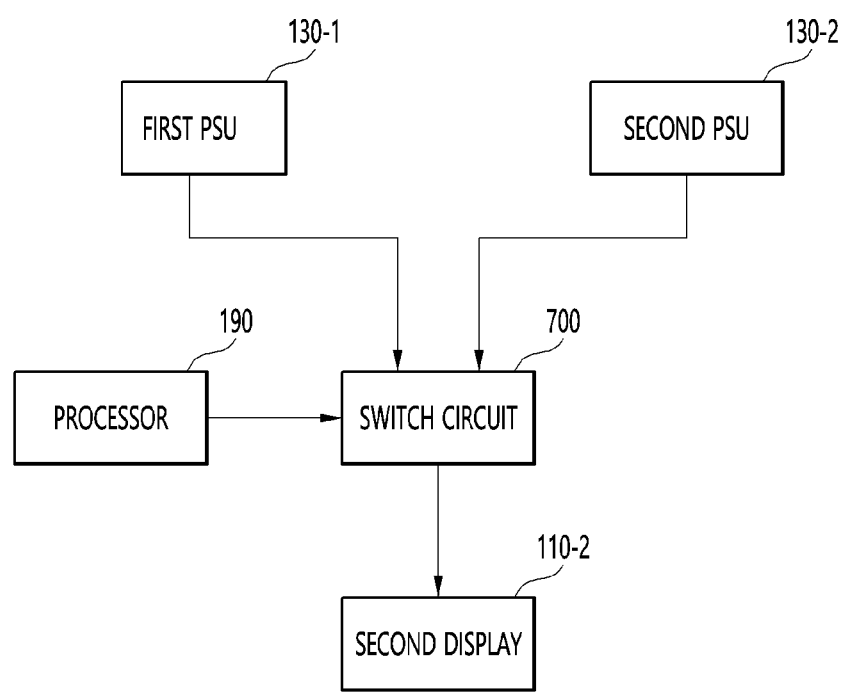
FIG. 7 is a diagram illustrating a process in which a first PSU shares power with a second display through a switch circuit according to an embodiment of the present disclosure.

FIG. 7 is a diagram illustrating a process in which a first PSU shares power with a second display through a switch circuit according to an embodiment of the present disclosure.

In FIG. 7, it is assumed that the reserve power of the first PSU 110-1 is shared with the second display 110-2.

The processor 190 may control the switch circuit 700 so that the reserve power of the first PSU 130-1 is supplied to the second display 110-2. At the same time, the processor 190 may control the switch 700 so that power of the second PSU 130-2 is also supplied to the second display 110-2.

The switch circuit 700 may include one or more switches and may be used for power sharing between adjacent PSUs. The switch circuit 700 may be placed between the PSU and an adjacent display. A plurality of switch circuits 700 may also be provided to correspond to the plurality of displays.

The switch circuit 700 may be disposed between the first PSU 130-1 and the second display 110-2. The processor 190 may connect or disconnect the first PSU 130-1 and the second display 110-2 according to the control signal.

The switch circuit 700 may include various types of power semiconductors, such as an insulated-gate bipolar transistor (IGBT) and a MOSFET.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device described above is not limited to the configuration and method of the above-described embodiments, and the above embodiments may be configured by selectively combining all or some of embodiments such that various modifications may be made.

What is claimed is:

1. A display device comprising:
   a first display;
   a first power supply unit (PSU) configured to supply power to the first display;
   a second display;
   a second PSU configured to supply power to the second display; and
   a processor configured to obtain a first average peak luminance (APL) of a first image to be displayed on the first display, obtain a second APL of a second image to be displayed on the second display and perform control to supply first reserve power of the first PSU or second reserve power of the second PSU to the first display or the second display based on a result of comparison between the first APL and the second APL.

2. The display device of claim 1, wherein the processor performs control to supply the first reserve power of the first PSU to the second display, when the first APL is greater than the second APL.

3. The display device of claim 2, wherein the processor performs control to supply the first reserve power of the first PSU to the second display, when the first APL is peak luminance and the second APL is maximum luminance.

4. The display device of claim 2, further comprising a switch circuit configured to connect or disconnect the first PSU and the second display,
   wherein the processor controls the switch circuit to supply the first reserve power of the first PSU to the second display.

5. The display device of claim 1, wherein the processor obtains the first reserve power of the first PSU based on a first white rate of the first image and obtains the second reserve power of the second PSU based on a second white rate of the second image.

6. The display device of claim 5, further comprising a memory configured to store a matching table including a plurality of white rates and a plurality of reserve powers respectively matching the plurality of white rates,
   wherein the processor obtains the first reserve power and the second reserve power through the matching table.

7. The display device of claim 1, wherein the processor performs control to supply the second reserve power of the second PSU to the first display, when the first APL is less than the second APL.

8. The display device of claim 1, wherein the first PSU and the second PSU are connected to each other through a power cable.

9. A method of sharing power of a display device comprising a first display, a first power supply unit (PSU) configured to supply power to the first display, a second display and a second PSU configured to supply power to the second display, the method comprising:
   obtaining a first average peak luminance (APL) of a first image to be displayed on the first display;
   obtaining a second APL of a second image to be displayed on the second display; and
   performing control to supply first reserve power of the first PSU or second reserve power of the second PSU to the first display or the second display based on a result of comparison between the first APL and the second APL.

10. The method of claim 9, wherein the performing control comprises performing control to supply the first reserve power of the first PSU to the second display, when the first APL is greater than the second APL.

11. The method of claim 10, wherein the performing control comprises performing control to supply the first reserve power of the first PSU to the second display, when the first APL is peak luminance and the second APL is maximum luminance.

12. The method of claim 10,
   wherein the display device further comprises a switch circuit configured to connect or disconnect the first PSU and the second display, and
   wherein the performing control comprises controlling the switch circuit to supply the first reserve power of the first PSU to the second display.

13. The method of claim 9, further comprising:
   obtaining the first reserve power of the first PSU based on a first white rate of the first image; and
   obtaining the second reserve power of the second PSU based on a second white rate of the second image.

14. The method of claim 13, further comprising storing a matching table including a plurality of white rates and a plurality of reserve powers respectively matching the plurality of white rates,
   wherein the obtaining the first reserve power and the second power comprises obtaining the first reserve power and the second reserve power through the matching table.

15. The method of claim 9, wherein the performing control comprises performing control to supply the second reserve power of the second PSU to the first display, when the first APL is less than the second APL.

* * * * *